April 26, 1966   J. PICANOL   3,247,870
MECHANISM FOR ACTUATING THE RETAINERS OF THE COP
MAGAZINES ON MULTI-WEFT LOOMS
Filed July 3, 1962   10 Sheets-Sheet 1

INVENTOR.
J. Picanol
BY
Richards & Geier
ATTORNEYS

INVENTOR.
J. Picanol
BY
Richards & Geier
ATTORNEYS

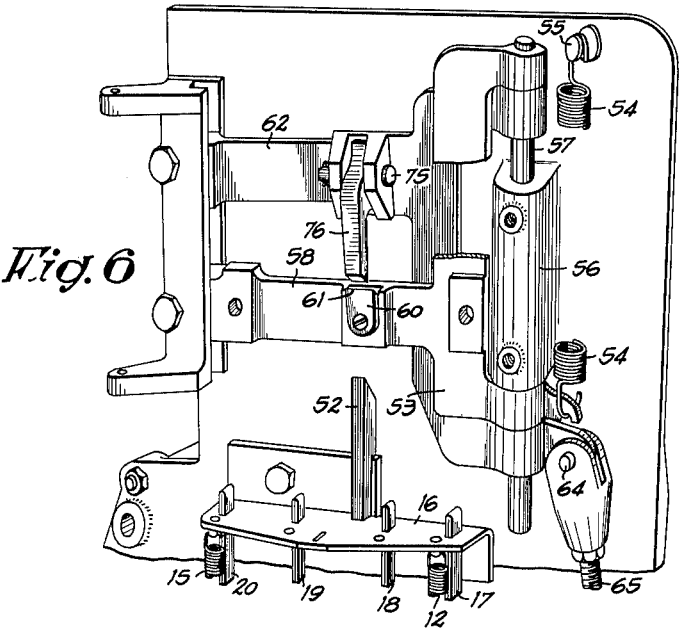
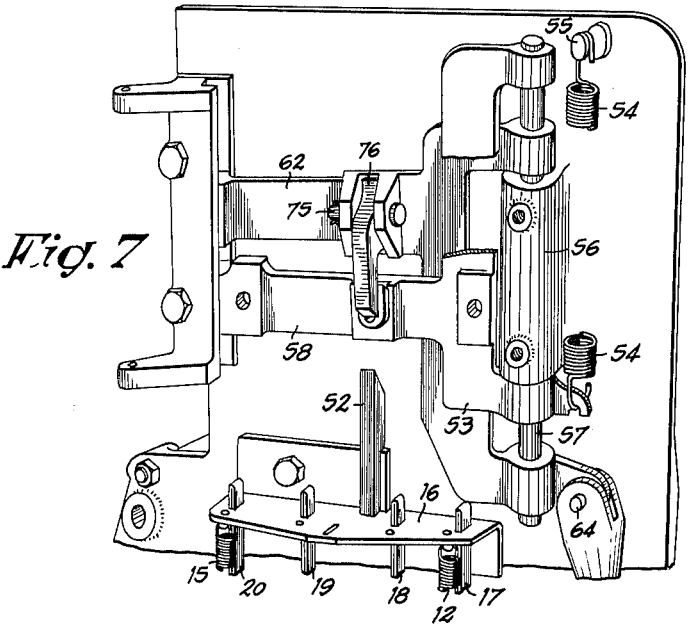

INVENTOR.
J. Picanol
BY Richards & Geier
ATTORNEYS

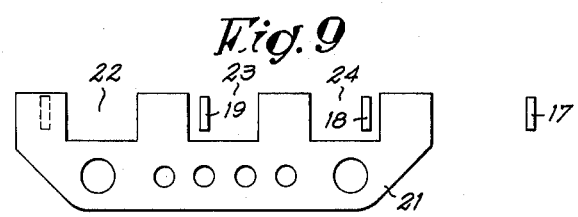
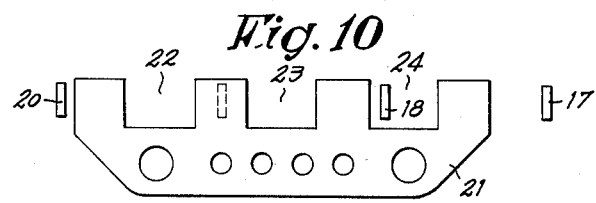
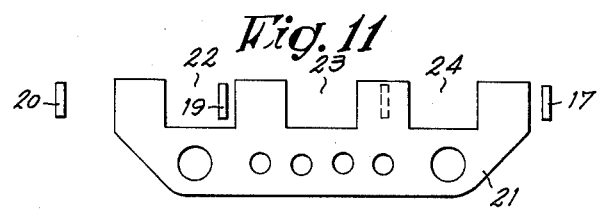
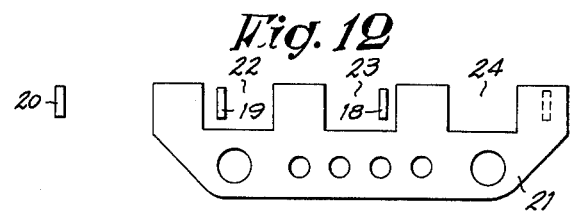

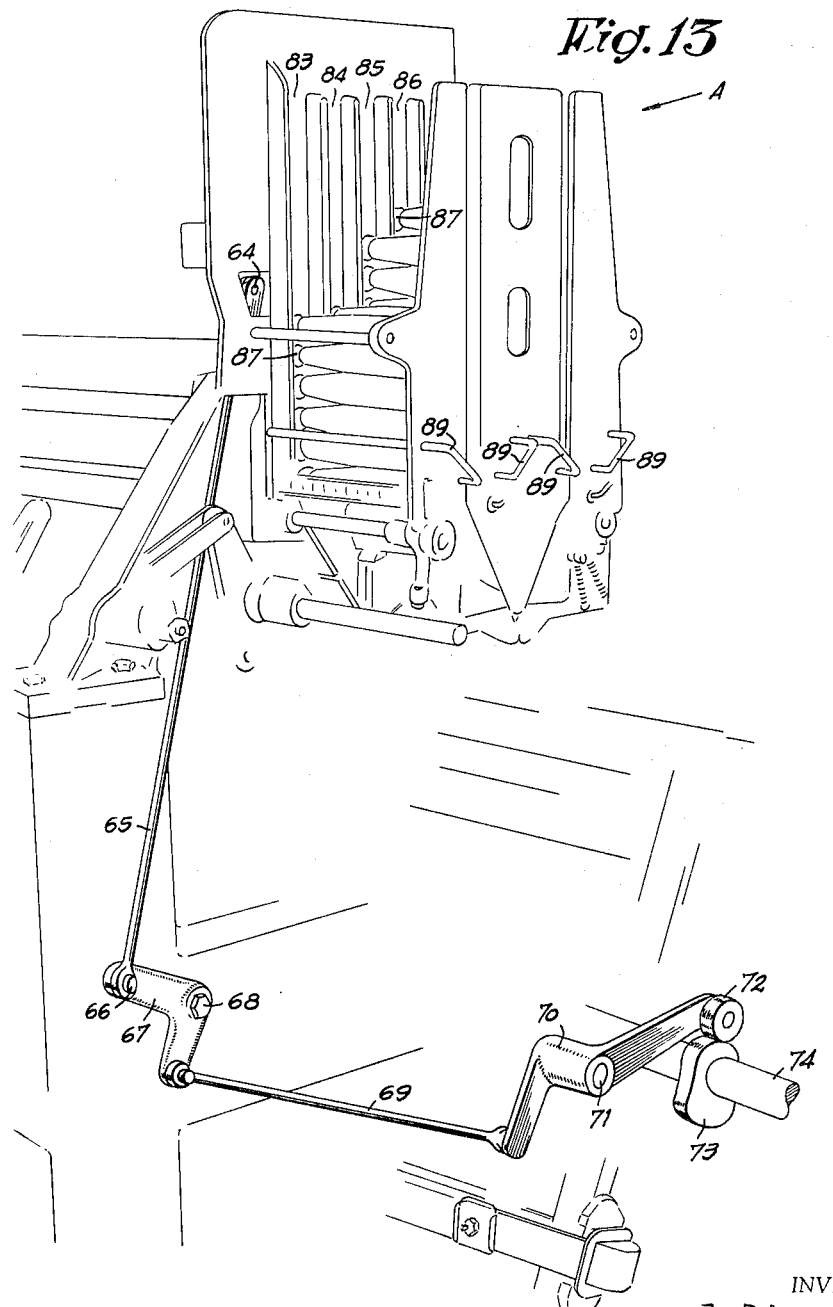

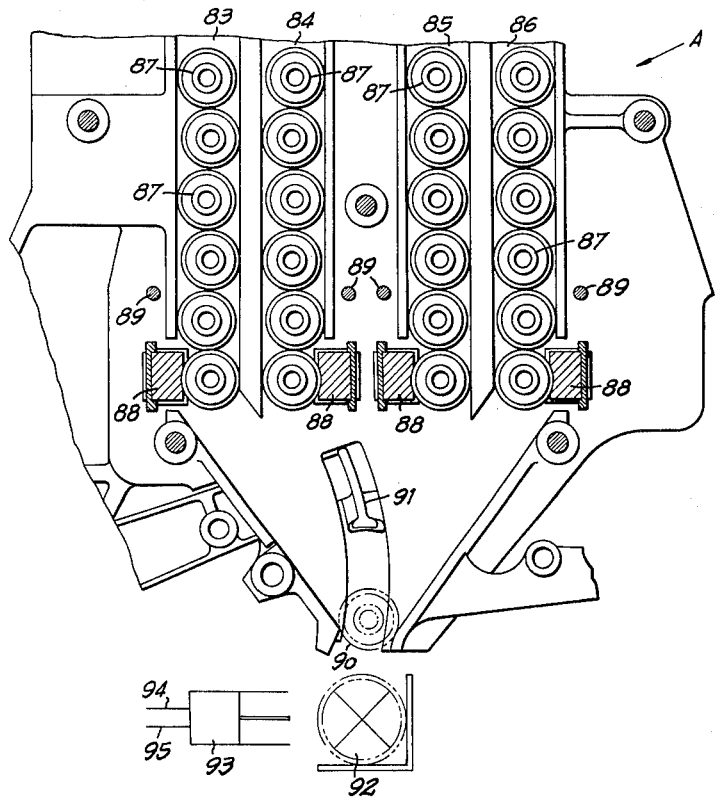

United States Patent Office 3,247,870
Patented Apr. 26, 1966

3,247,870
MECHANISM FOR ACTUATING THE RETAINERS OF THE COP MAGAZINES ON MULTI-WEFT LOOMS
Jaime Picanol, "Casa Pairal Catalunya," Zandberg, Zillebeke-lez-Ypres, Belgium
Filed July 3, 1962, Ser. No. 207,370
Claims priority, application Belgium, Mar. 20, 1962, Patent 615,294
7 Claims. (Cl. 139—232)

In multi-weft looms, the problem of feeding the cop changing mechanism is intricate. In fact, it is not only required that the partitioned magazine must liberate at the proper moment cops of different wefts, but the order of this distribution is infinitely variable. Due account must be taken of the fact that shuttles containing a cop which the feeler has detected to be exhausted may appear under the copchanger mechanism either after a single pick or after a smaller or larger number of picks. Hence, the mechanism for actuating the retainers which hold the cops in their respective compartments of the magazine must necessarily be designed in such way as to be able first to prepare the release of the cops at the pro rata of those which have been found to be exhausted, and then to actually release aforesaid cops from the magazine when the shuttles containing aforesaid exhausted cops appear under the cop-changing mechanism; and this without regard to the instant and to the number of passages of other shuttles containing cops which have been found to be exhausted or not.

A first object of the present invention thus concerns a mechanism which acts at the same time as a memorizer or recorder of an empty cop and a means for triggering at the proper time the release of a full cop. A memorizer should be understood to comprise a mechanical device designed in such way that when the feeler detects an empty cop, this fact is so to say being recorded and that the mechanism corresponding to the compartment in which the shuttles of the same weft are housed is automatically prepared for triggering at the proper moment the contrivances which control the evacuation of a full cop toward the changer mechanism.

The actual triggering means should be understood to comprise the whole of the contrivances which releases the cops at the proper moment.

Another object of the present invention concerns the design of such mechanism which is capable of effecting such recordings, respectively of preparing and triggering the retainer devices of the magazine within the shortest possible time in order to leave the released cop all the time needed for coming to rest and being held correctly in the changer mechanism.

Another object of the present invention is concerned with designing this mechanism in such way that it could be made to operate with a single electromagnetic device actuated by the cop changing feeler and capable of shifting into recording position the appropriate contrivance corresponding to each of the magazine compartments.

Still another object of the present invention concerns the automatic reset of aforesaid recording elements when the cop of the corresponding magazine has been evacuated, so that the mechanism is thus permanently and automatically brought back into its initial position each time when a corresponding cop has been evacuated.

Finally, still another object of the present invention is to be found in the very combination of these various elements by bringing them together into a strong and compact assembly, whereby the triggering at the proper moment of the elements which retain the cops in their compartment of the magazine is effected in an absolutely systematic way and under direct control of that mechanism of the loom which determines the pattern.

The mechanism conforming to the present invention is essentially characterized by the fact that it consists in the combination of a number of devices for actuating the elements which retain the cops in the magazines, equal to the number of compartments of the latter; over aforesaid actuating devices, a constantly reciprocating part; between aforesaid actuating elements and aforesaid reciprocating part, a selective recording device controlled and displaced across by the pattern mechanism of the loom and, between aforesaid reciprocating part and aforesaid selective recording device, an intermediate connecting device, whereby the connection between the three devices is controlled by the feeler of the cop changer.

The characteristic features of these various objects of the present invention are set-out in full detail below, with reference to the appended drawings of which:

FIGURES 6, 7 and 8 illustrate, in three characteristic positions, the elements which drive the selection and actuating mechanisms;

FIGURES 9, 10, 11 and 12 illustrate the characteristic reed of the selective recording device in the four position corresponding respectively to the drive of each of the releasing mechanisms of a cop;

FIGURE 13 is a perspective view of the kinematic connection between the driving elements of FIGURES 6, 7 and 8 on the one hand and the crankshaft on the other hand;

FIGURE 15 is a cross-section through the cop magazine, looking to the right of FIG. 13; it shows the cop retainers, the cop changing mechanism with a shuttle and an electrical empty cop feeler.

In the embodiment illustrated by aforesaid figures, the mechanism according to the present invention is substantially formed by the combination (a) of a device 1 designed for ensuring the individual actuation of the elements which retain the cops in the different compartments of the magazine, (b) a selective recording device 2, (c) a driving device 3 acting onto aforesaid actuating device through the medium of aforesaid selective recording device 2.

The actuating device 1 consists of a number of mechanisms equal to the number of compartments in the magazine, each of these mechanisms controlling the position of the element supporting the lower cop in any of aforesaid compartments, as well as the position of the element or elements which must act as temporary support of the next cop when the first one has been released in order to reach the cop changer mechanism by gravity. These elements for supporting the cops in the lowest part of each magazine compartment are essentially variable and are no part of the present invention. They shall preferably consist of elements moving in a straight line and capable of being displaced in mutually opposite directions by the rocking beams 4–5–6–7 respectively. These elements are described and illustrated, for example, in my co-pending patent application, Ser. No. 207,369.

Each of these rocking beams has a side arm 8–9–10–11 respectively, each of which is permanently loaded by a return spring 12–13–14–15 respectively. The upper ends of aforesaid springs are hooked to a horizontal plate 16. This plate is fixed and affords an easy-fit passage to the rods 17–18–19–20 whose lower ends are hinged to pivots bearing respectively on aforesaid arms 8–9–10–11. In the position of rest, aforesaid rods 17–18–19–20 are correctly aligned, so that their upper free ends are all located in the same horizontal plane. By means of this arrangement, each of aforesaid rods can actuate the mechanism which releases the cops at the corresponding compartment, by a simple longitudinal downward motion produced for instance by the effect of a push.

Figure 1:
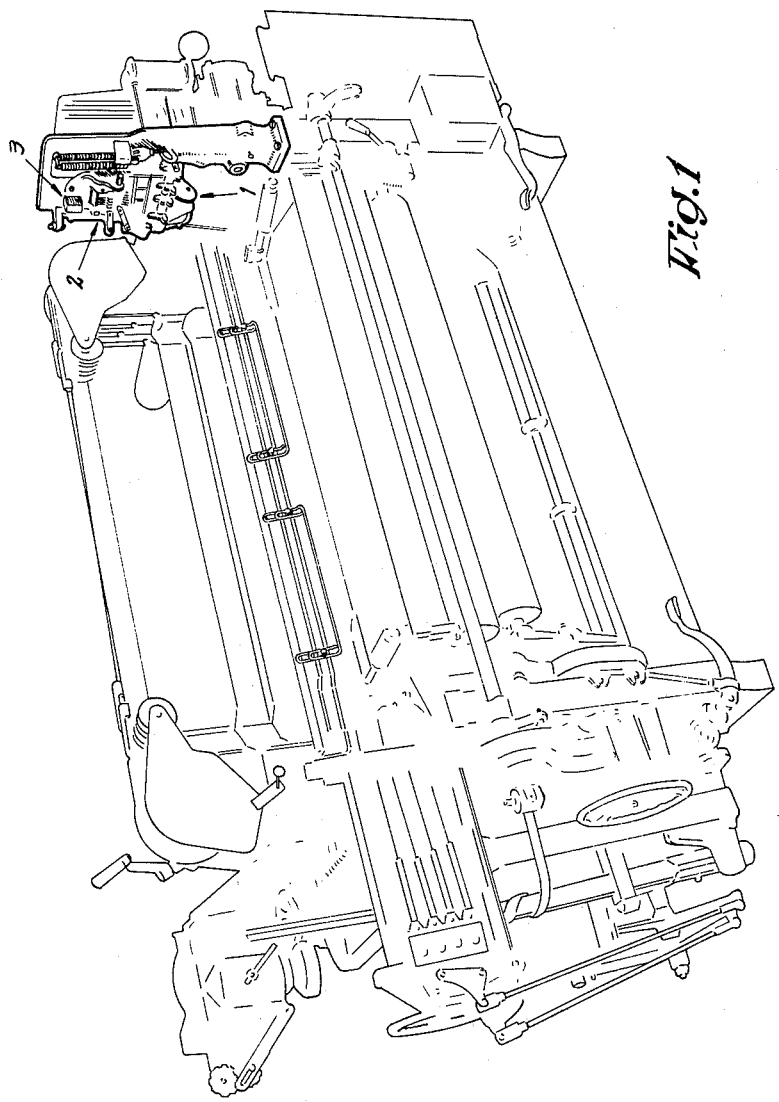
FIGURE 1 is a diagrammatic general view showing the location of the mechanism for actuating the retainers of the cop magazines, according to the present invention, on a multiweft loom.
Figure 2:
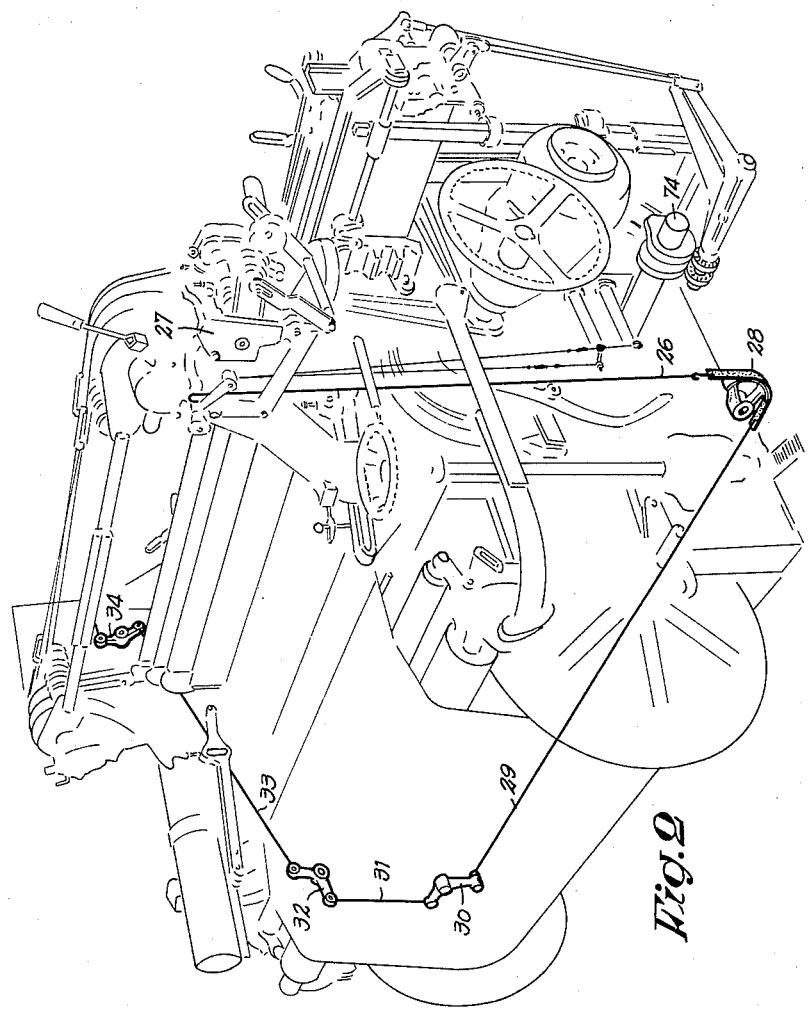
FIGURE 2 is a diagrammatic overall view of the rear part of the loom, showing the kinematic connection between the mechanism of the present invention and the mechanism which determines the pattern of the loom.

The device 2 for recording the empty cops and for preparing the actuating mechanism of the compartment corresponding to the cop which is to replace at the proper moment aforesaid empty cop comprises substantially the following parts: a selector reed 21 formed in the present instance, by a strip which is parallel to aforesaid fixed plate 16 and is provided with three notches 22–23–24. This selector reed 21 is mounted above aforesaid fixed plate 16 and is connected to a partially represented slide 25 which can be displaced crosswise step by step under the control of the pattern mechanism of the loom. In the form of embodiment which has been represented, this connection consists, as shown diagrammatically in FIGURES 2 and 3, of rod 26 connected to the pattern mechanism of the loom denoted by 27, connecting strap 28, rod 29, bell-crank lever 30, rod 31, bell-crank lever 32, rod 33, rocking lever 34 pivoting about the fixed axle 35, and connecting rod 36 which is hinged on the one hand at the end of aforesaid rocking lever 34 about pivot 37, and on the other hand, on aforesaid slide 25 by means of pivot 38. A coil spring 39 is wound about aforesaid fixed axle 35, whereby one of its ends 40 is hooked to aforesaid rocking lever 34, whilst its other end 41 is hooked to aforesaid slide 25. Above aforesaid selector reed 21 and parallel to the latter, there is an axle 42 onto which four loose needles 43–44–45–46 respectively are mounted, each of these being provided with two side arms so that each needle has approximately the shape of a cross. Each one of these needles is permanently acted upon by a spring 47-48-49-50 respectively, which springs are fastened on the one hand to the lower end of aforesaid needles, and on the other hand to aforesaid selector reed 21; this traction effort is such that each needle which rocks about the common axle 42 is retained in this tipped-over position by its spring right up to the moment when it is put upright again for being brought back into its initial state. In this state and under the action of the same springs working as traction springs, the upper ends of aforesaid needles abut on a rod 51 acting as a stop and means of alignment. Toward its medium part, aforesaid fixed plate 16 carries a pointer 52 disposed so as to be always at a certain distance under one of the side arms of one of aforesaid four needles.

This selective recording device is connected to a first drop-frame 53 by aforesaid reed 21. This connection however designed in such way that aforesaid slide can move crosswise with respect to aforesaid drop-frame whilst being carried along with it when the latter is displaced vertically. This drop-frame is permanently drawn back into its upper position by an elastic means represented by spring 54 which is fastened, on the one hand, to aforesaid drop-frame, and on the other hand to a fixed stud 55, aforesaid upper position being delimited by the tubular guide 56 through which passes the longitudinal rod 57 along which aforesaid drop-frame can slide.

In the middle of its front face, cross-piece 58 of drop-frame 53 carries an impact stop 59 and a guiding stop 60 the upper edge of which has a bevel 61 inclined toward the upper edge of aforesaid impact stop 59.

Finally, the driving mechanism 3 substantially consists of a second drop-frame 62 mounted above aforesaid drop-frame 53. This latter drop-frame is guided along the same aforementioned rod 57 and is drawn toward its upper position by an elastic means represented by spring 63 which is fastened on the one hand to a pivot 64 bearing against the lower part of aforesaid drop-frame 62, and on the other to aforesaid fixed stud 55. The corresponding end of a rod 65 is hinged to aforesaid pivot 64, whereas its other end is hinged, by means of pivot 66, onto one of the arms of a bell-crank lever 67 mounted loose on pivot 68. The other arm of this bell-crank lever is, through the medium of cross-piece 69, fastened to one of the arms of a second bell-crank lever 70 swinging about pivot 71 and whose second arm carries a roller 72 which is in permanent contact with cam 73 keyed to the slay axle 74. In the middle of the front face of the second drop-frame there is a horizontal pivot 75 about which is hinged a finger 76 which, normally, either by its own weight, or by an elastic element, is brought into such a position that its rear face comes to stand slightly forward of the front face of aforesaid guiding stop 60 carried by the first drop-frame 53. The same second drop-frame 62 carries, ahead of aforesaid finger 76 and by means of an appropriate fastening means diagrammatically shown in 77, an electro-magnet 78 the armature of which is provided with a horizontal pivot 79 around which swings a flap 80 connected to the upper part of a rod 81 of which the lower part goes with an easy fit through the fixed horizontal plate 16 which thus serves as a guide. This rod 81 carries a side finger 82 which is always placed under the second side arm of a needle 43 to 46, aforesaid electro-magnet 78 and its special armature fixture 80–81–82 being designed in such way that when aforesaid electro-magnet is energized, aforesaid side finger 82 trips-over the needle which is in its trajectory.

The cop magazine A shown in FIGS. 13 and 15 comprises four compartments 83, 84, 85 and 86. In each of these compartments the cops 87 are controlled by a retaining-releasing slide 88 cooperating with a slidable rod 89. To release the lower cop in one compartment, slide 88 and rod 89 are moved in opposite directions. For this purpose, the slide 88 and the cooperating rod 89 are pivotally mounted on opposite ends of the corresponding rocking beam 4–7 (FIG. 3).

When a cop 90 is released from one of the compartments of the magazine A, it is subjected to the action of a transfer hammer 91 which presses this cop 90 into a shuttle 92, the empty cop of which being expelled in the process.

Figure 3:
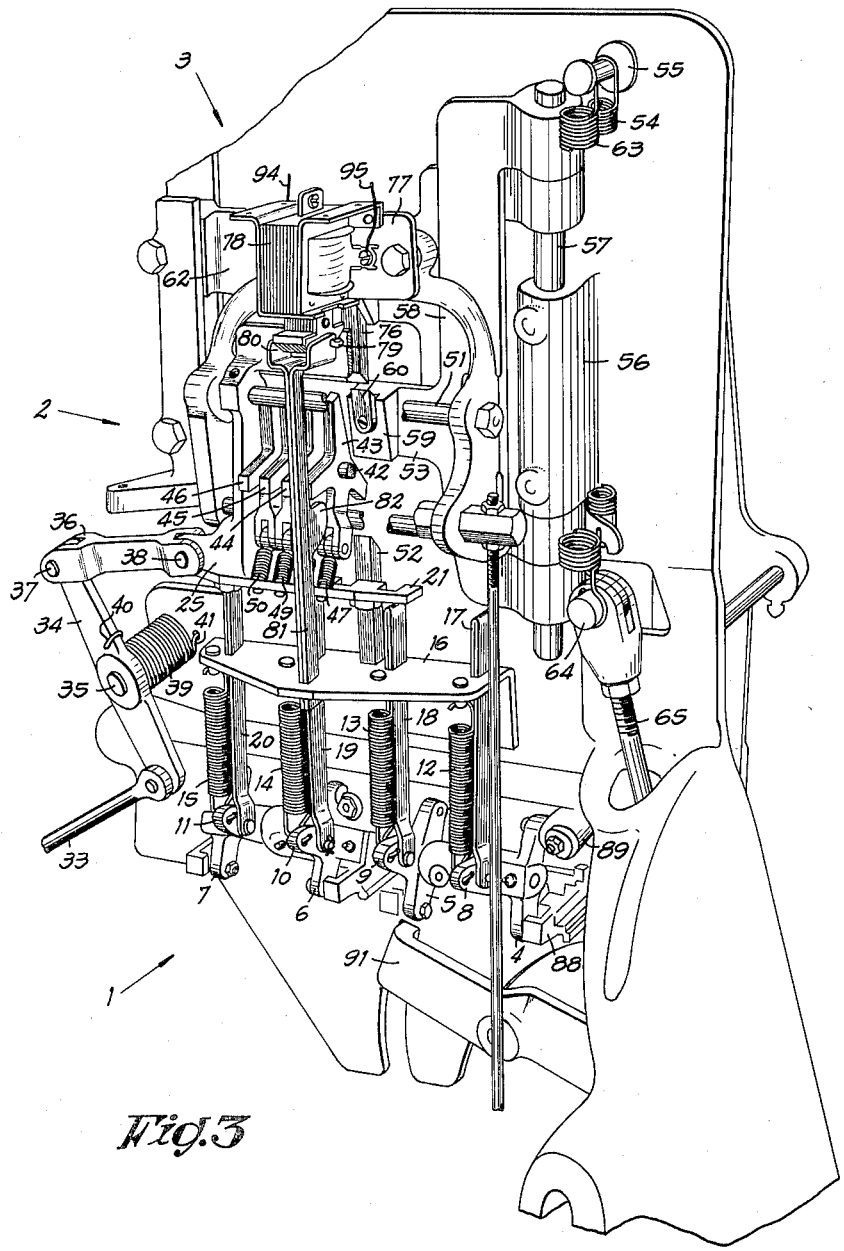
FIGURE 3 is a perspective representation, in the position of rest, of the main elements of the mechanism according to the present invention.

The operation of this mechanism is as follows: at the start, the position is that which is illustrated in FIGURE 3. During normal operation of the loom, the second drop-frame 62 is constantly subjected to a vertical up and down motion determined by cam 73 of the lay axle 74 onto which aforesaid drop-frame is connected by the elements 65 to 72 which have been described above.

During this rectilinear reciprocating motion, aforesaid drop-frame 62 normally moves freely, whereby finger 76 moves opposite the guiding stop 60 of the first drop-frame 53.

At the same time, the selector slide 25 moves "step by step" to the left and to the right under the stimulus of the pattern mechanism denoted by 27, through the medium of the elements 26 to 38 described above.

In this "step by step" motion, aforesaid needles 43 to 46 are brought, according to the displacements of aforesaid slide, either opposite or above the side finger 82 of the electro-magnet armature 78.

In this same waiting position, all rods 17 to 20 are held in due alignment with their upper free ends at the same level. Also in this position, the four retaining-releasing slides 88 and their cooperating rods 89 are held in the active position, i.e. in the position in which they support a stack of full cops.

When, during normal operation of the loom, a cop happens to be empty, this will be detected by the feeler 93 and will cause the latter to close the electric circuit to the electro-magnet 78 through the metal part of the cop by the conductors 94 and 95, so that this electro-magnet will instantly attract its armature 80–81–82. Finger 82 of aforesaid armature, by moving upward, comes into contact with and is pushed against the side arm of the corresponding needle, causing the latter to tip.

Figure 4:
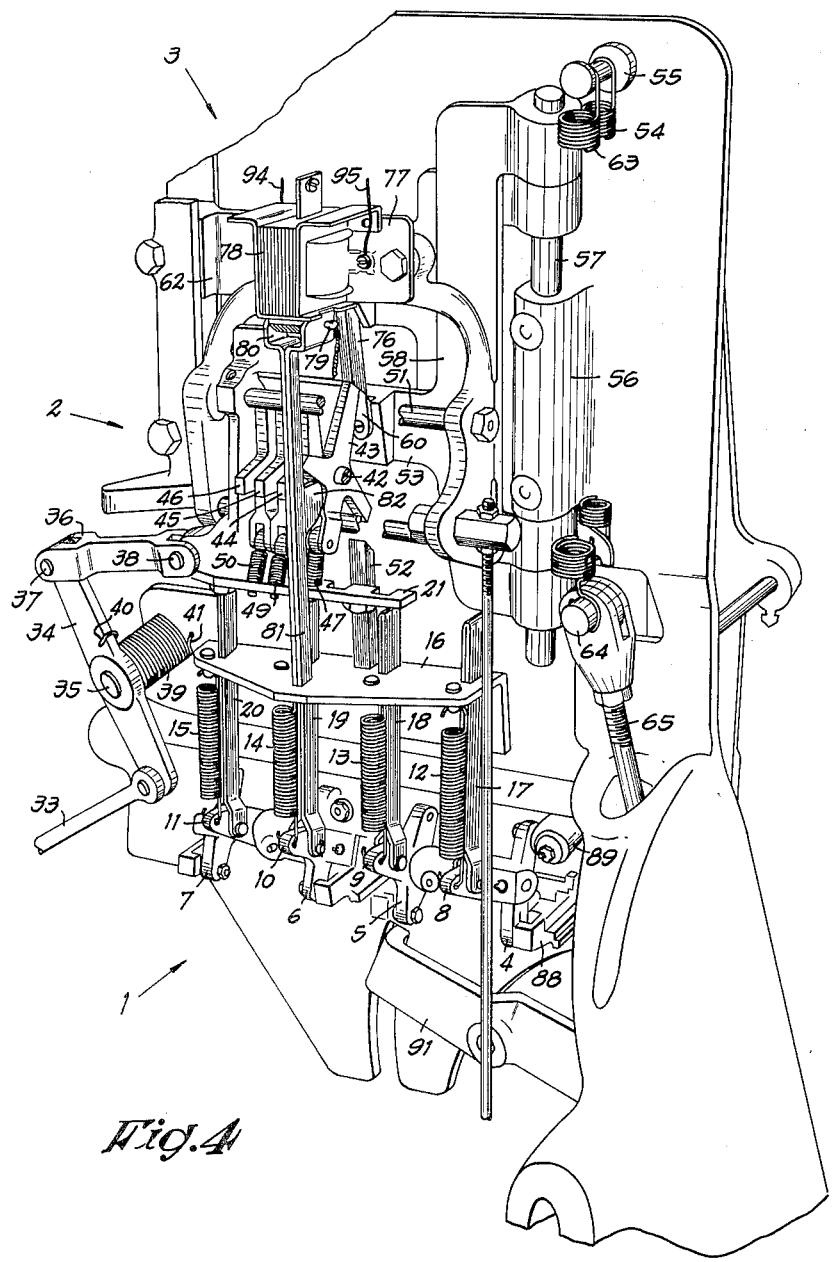
FIGURE 4 is similar to FIGURE 3, with this difference that the mechanism is represented in a position in which a cop which the feeler has found to be empty, is being recorded.
Figure 5:
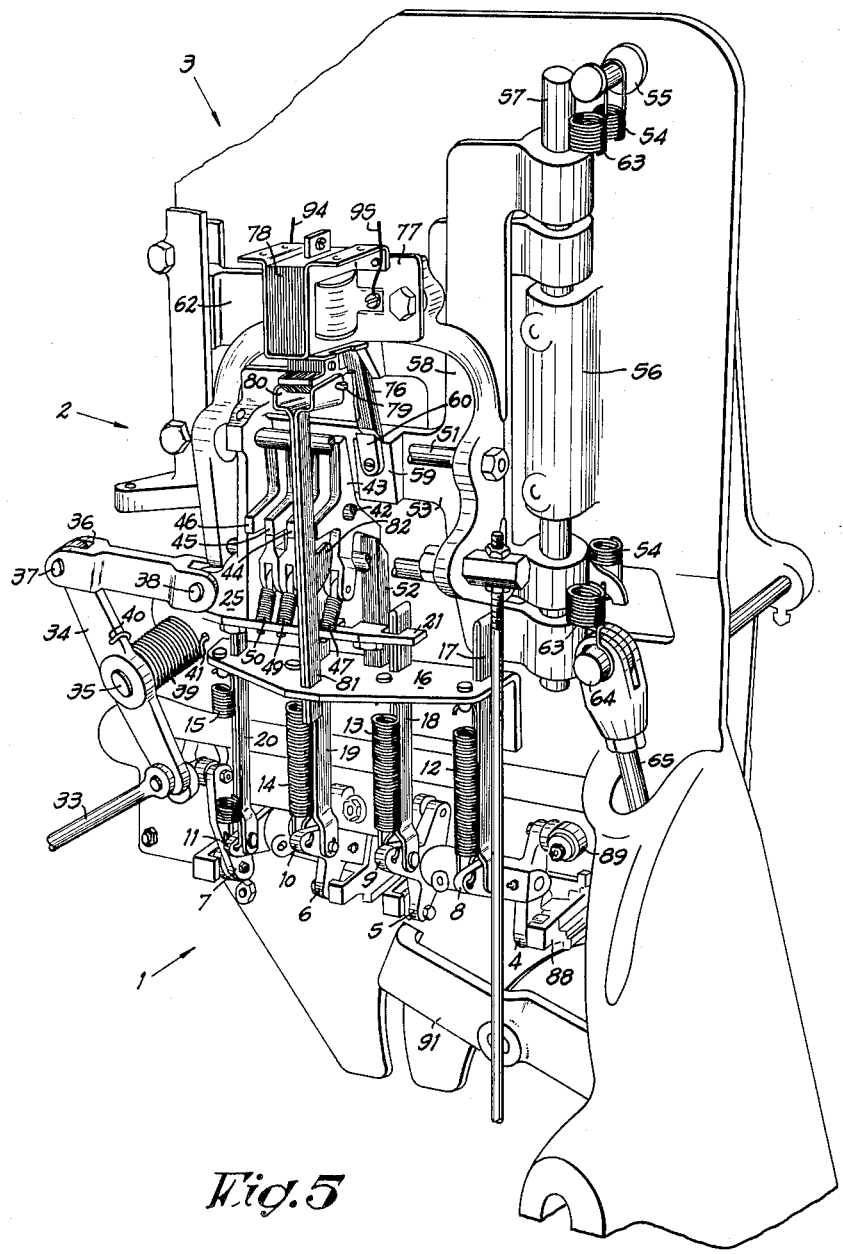
FIGURE 5 is similar to FIGURES 3 and 4, with this difference that the mechanism is represented therein in the position in which it triggers the release of a cop.
Figure 8:
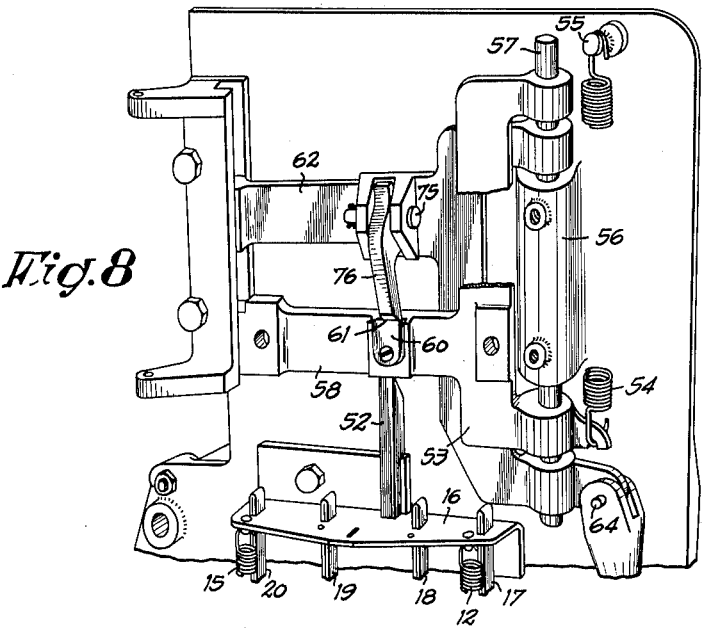

As illustrated in FIGURE 4, it is the first needle which is thus being tipped, this needle corresponding to the first compartment of the magazine, considering that it is a cop issuing from this first compartment which the feeler 93 has found to be empty.

On account of the relative arrangement between aforesaid needle, the axis about which it swings and its traction spring, aforesaid needle is held in this tipped position under the elastic action of aforesaid spring in the manner of a rocker arm. In this position, this needle acts so to say as a recorder which will make it possible, when this same empty cop appears again at the cop changer device, to trigger the release of a full cop the weft of which corresponds to that which was carried by the empty cop. Indeed, if the same cop which has previously been found empty appears at the cop changing mechanism, the pattern mechanism denoted by 27 will not have given rise to any motion of the elements 26 to 38 nor to the selector slide 25. The latter will thus not have undergone any displacement. Hence, in its subsequent downward motion, finger 76 of the second drop-frame 62 buts against the upper end of the tipped needle which, in the present instance, is needle 43. The lower free end of aforesaid finger 76 is thus made to face guiding stop 60 and, through the medium of the latter, is brought into contact with impact stop 59 and cross-piece 58 of the first drop-frame 53. The latter, against the action of return-spring 54, is carried downward and, when it rises again in turn, takes with it selector slide 25. Now, in the latter, by the pattern mechanism of the loom, the selector reed 21 has been brought into a position in which it releases all the rods, in the present instance 18–19–20, i.e. except rod 17 which corresponds to the mechanism of the magazine containing the cop to be released (see relative position FIGURE 12). Aforesaid need 21 being carried along in the same downward movement because it is connected to the selector slide, thus only pushes back rod 17 so that the latter actuates the mechanism corresponding to the element which retains the cops in the corresponding compartment of the magazine. If, on the contrary, when a cop has been found to be empty, the shuttle in which it is contained is held fast in the box for some time on account of the change of weft controlled by the pattern mechanism 27 of the loom, slide 25 having been displaced sideways, the needle which has been tipped is retained in this tipped position by its spring. As long as the weft corresponding to aforesaid tipped needle is no longer controlled by aforesaid pattern mechanism, aforesaid needle remains in this recording or waiting position, thus acting as a real recorder. If in the meantime a second cop has been found to be empty, the same process is repeated because the electro-magnet 78 will be energized and that its armature will tip in the same manner the needle corresponding to the compartment containing the cops of the same weft. The third and fourth needles could in turn be tipped or not without the slightest trouble for the device which records the empty cops. Whatever the number of needles which have been tipped, this record will be retained as long as the cop or cops which have been found to be empty appear again under the changer mechanism. At this moment, under control of the pattern mechanism 27 of the loom, it is the tipped needle corresponding to the cop carrying the proper weft which will come in the trajectory of finger 76 of the second drop-frame 62. Further, it is the corresponding rod 17–18–19 or 20 which will be capped by a solid part of the selector reed 21, the other rods being released, and it is thus really the rod which has thus been capped which will be pushed back by aforesaid reed and will permit the instant release of a cop bearing the weft indicated by the pattern mechanism 27 of the loom.

Figure 14:
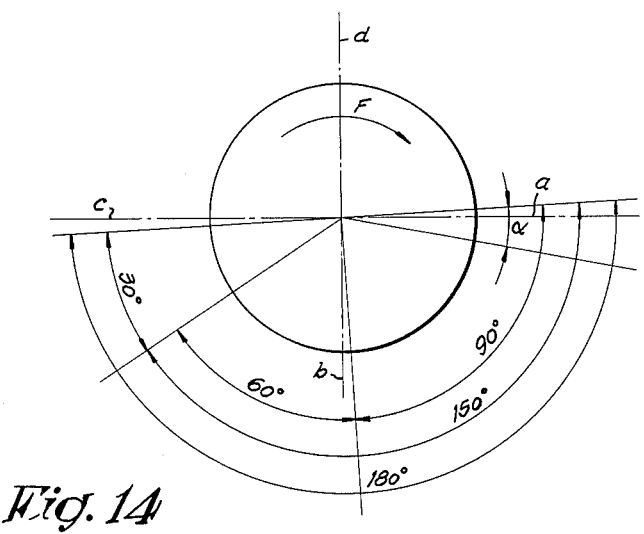
FIGURE 14 is a diagram showing the position of the crankshaft with respect to the various operating phases of the mechanism conforming to the present invention.

It thus appears from the foregoing that, with this mechanism, whatever may be the mixes between the cops which the feeler has found to be empty or not, and whatever be the length of time that one or several cops which have been found to be empty or not stay in the change box, the change will take place systematically at the proper moment, i.e. when, at any time, a cop which the feeler has found to be empty appears in the changer. This working is not only systematic in recording the empty cops as well as in releasing at the proper moment the full cops, but also in the extreme speed of this operation. Indeed, if in the schematic operational diagram represented in FIGURE 14 one considers the successive positions of the crankshaft and the correlated positions of the mechanism which is the object of the present invention, it becomes quite evident that there is really plenty of time available for making sure that the changer mechanism is timely fed. In this figure, points a–b–c–d, represent respectively the foreward, lower, rear and upper dead centers of the crankshaft which, in this diagram, is supposed to rotate in the direction of arrow F. The feeler 93 operates slightly before, during and after the forward dead center denoted by $a$. The angle described by the crankshaft whilst the feeler 93 operates is indicated by $\alpha$. When the feeler 93 begins to operate, i.e. when it tests an empty cop, the electromagnet 78, which is immediately energized, begins to respond. Such an electromagnet has however a certain amount of inertia so that a certain time is required for its armature to be attracted and then returned to its initial position by gravity, during which time the crankshaft has reached a position which lies in the vicinity of the lower dead center. In practice, one may consider that at this instant the crankshaft has described an angle of the order of 90°. At this same moment, the cross-travel of the selector slide 25 takes place, if the pattern mechanism 27 of the loom imposes the use of another weft for the next pick. If such a cross-displacement of aforesaid selector slide 25 has taken place, the latter will come to a standstill after a further angular displacement of the crankshaft, of the order of 60°. It thus appears that the total angular displacement of the crankshaft, from the moment when a cop is found to be empty until the moment when the first drop-frame 53 can eventually begin to operate, is of the order of 150°.

During the downward movement of the drop-frame, the crankshaft will have gone through a further angular displacement of the order of 30°.

The consequence thereof is that the maximum rotation of the crankshaft, between the moment when the feeler has discovered that a cop is empty and the moment when the release mechanism of a cop from the magazine is put into action, is 180° at most. Considering that the return of the shuttle into the changer mechanism only occurs once for every two picks, i.e. each time after two full rotations of the crankshaft, it results therefrom that the time which is available for releasing a full cop and bringing it onto the correct position in the changer mechanism, corresponds to an angular displacement of the order of 540°, which is ample for bringing the full cop to an absolute standstill in the correct position in the changer mechanism, and therefore for securing a change under ideal conditions without any trouble which might result from a rebound or a wrong position of the cop.

The re-set into their original position of the elements recording the cops which have been found to be empty after a re-load of the shuttle occurs automatically. The fact is indeed that each tipped-over needle which is brought to face finger 76 by the pattern mechanism 27 of the loom, is also automatically facing the fixed pointer 52. It results therefrom that, when aforesaid tipped-over needle is carried down by the downward movement of the selector slide of the second drop-frame, its corresponding arm meets aforesaid pointer, so that the needle in question is automatically put upright again and is drawn into this upright position by its traction spring. Ipso facto, aforesaid needle, which has thus been put straight again, releases the end of aforesaid finger 76 of the second drop-frame, so that this finger is automatically put once more into an inoperative position, i.e. forward of guiding stop 60 of the first drop-frame.

It is obvious that these various devices and characteristic parts and features could be replaced by any devices, parts or features which fulfill the same function, without exceeding the scope of the present invention. Besides, the latter concerns as well each one of aforesaid devices, parts and characteristic features as well as the mechanism itself, and as well as the looms equipped with such mechanism.

What I claim is:

1. In a multi-weft loom having a slay, a crank shaft, a cop magazine having cop retainers, a shuttle and a pattern mechanism, in combination, an actuating device comprising a row of spaced vertical rods, the number of said rods being equal to that of said retainers, and separate means operatively connecting each rod with a separate retainer, said rods having free upper ends located in the same horizontal plane; a selective recording device comprising a slide, means connecting said slide with the pattern mechanism for reciprocating said slide stepwise horizontally in directions parallel to that of said row of spaced vertical rods, a notched selector reed connected with said slide, an axle extending parallel to said selector reed and connected with said slide, a plurality of cross-shaped needles rotatably mounted upon said axle, the number of said needles being equal to that of said rods, and a vertically movable drop-frame carrying said slide; and a driving device comprising a second vertically reciprocable drop-frame located above the first-mentioned drop-frame, means connected with the slay for moving the second-mentioned drop-frame, an electro-magnet carried by the second-mentioned drop-frame and having a movable armature, and means for energizing said electro-magnet and causing it to attract said armature when a cop is empty in the shuttle, said armature comprising means adapted to engage and swing one of said cross-shaped needles from an initial position to a tripped position when said armature is energized, the first-mentioned drop-frame having impact-receiving means and the second-mentioned drop-frame having impact transmitting means engaged and actuated by a needle in its tripped position to engage the impact-receiving means of the first-mentioned drop-frame and move the first-mentioned drop-frame along with the second-mentioned drop-frame, said notched selector reed while moving along with the first-mentioned drop-frame engaging and actuating that vertical rod which is connected with the cop retainer controlling cops with the desired weft.

2. An apparatus in accordance with claim 1, wherein the means of the selector recording device which reciprocate stepwise said slide along with said notched selector reed move the notched selector reed so that it covers one of said spaced vertical rods at a time.

3. An apparatus in accordance with claim 1, wherein the impact-transmitting means of the second-mentioned drop-frame comprise a swingable finger adapted to be engaged by an arm of a cross-shaped needle in its tripped position and wherein the impact-receiving means of the first mentioned drop-frame comprise an impact stop and a guiding stop connected with said impact stop, said swingable finger being adapted to engage said impact stop.

4. An apparatus in accordance with claim 1, wherein the means comprised in said armature and adapted to engage and swing one of said needles to a tripped position comprise a rod and a side finger carried by said rod and adapted to be moved under a side arm of a cross-shaped needle, each of said needles being moved in alinement with said side finger during the stepwise movement of said slide.

5. An apparatus in accordance with claim 1, wherein the extent of rotation of the loom crankshaft between the time the means for energizing said electro-magnet are actuated upon finding a cop empty and the time when a rod is actuated by the selector reed is at most 180°.

6. An apparatus in accordance with claim 1, wherein said selective recording device comprises a separate traction spring connected to each cross-shaped needle and said driving device comprises a fixed pointer adapted to engage an arm of a tripped needle for moving the tripped needle back to its initial position.

7. An apparatus in accordance with claim 6, wherein the traction spring of each cross-shaped needle resiliently holds its needle both in its initial and its tripped positions.

References Cited by the Examiner

UNITED STATES PATENTS

| | | | |
|---|---|---|---|
| 1,542,772 | 6/1925 | Hollins | 139—232 |
| 2,364,979 | 12/1944 | Jennings et al. | 139—232 |
| 2,391,370 | 12/1945 | Wakefield | 139—232 |
| 2,568,607 | 9/1951 | Blanchard | 139—232 |
| 2,634,765 | 4/1953 | Stuer | 139—232 |
| 2,699,187 | 1/1955 | Franceschini | 139—233 |

FOREIGN PATENTS

| | | |
|---|---|---|
| 769,673 | 6/1934 | France. |
| 1,221,282 | 1/1960 | France. |

DONALD W. PARKER, *Primary Examiner.*

RUSSELL C. MADER, *Examiner.*